Feb. 13, 1940.    A. J. HERSEY ET AL    2,189,901
CAR WHEEL
Filed Feb. 1, 1937
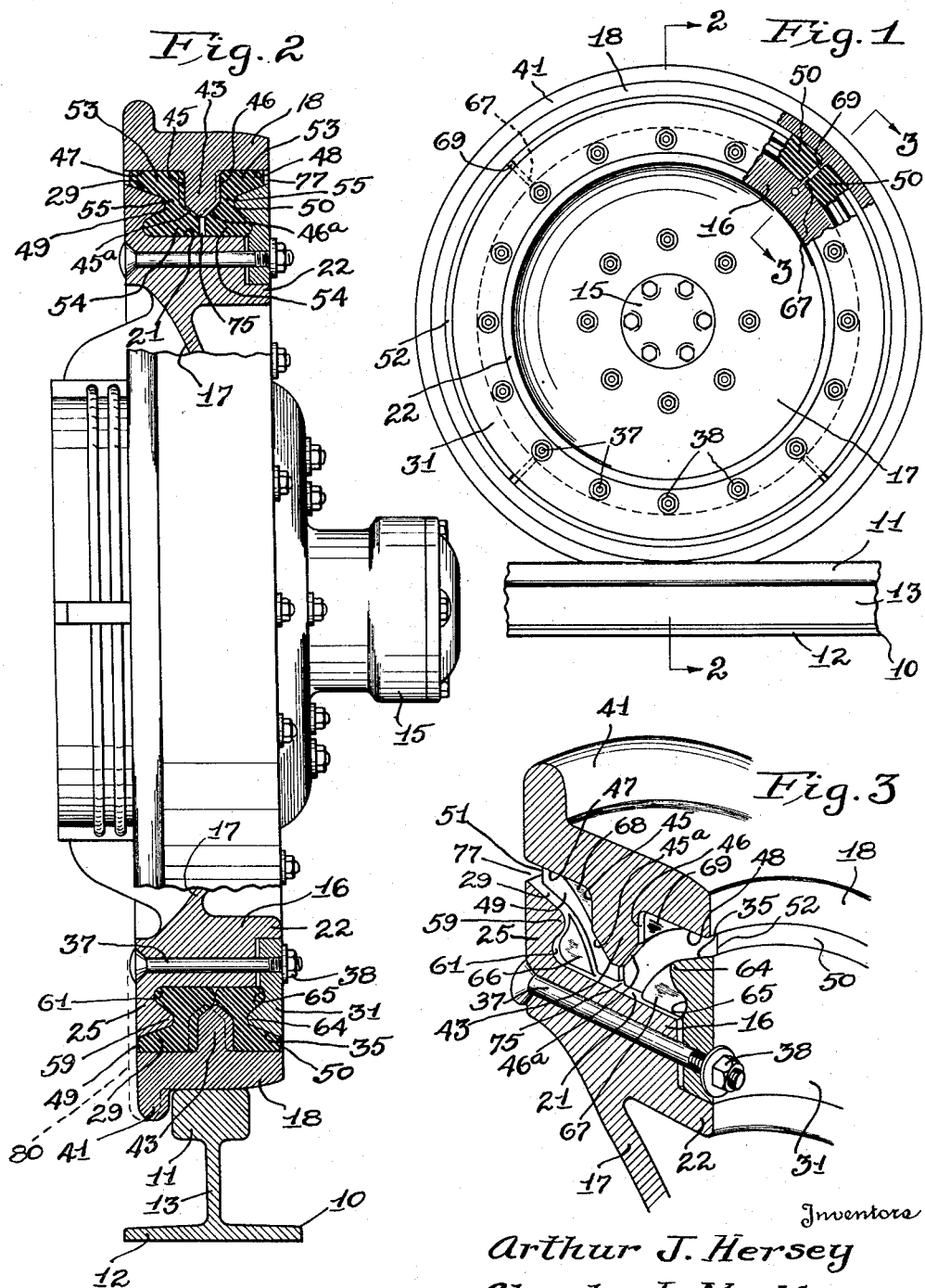
Inventors
Arthur J. Hersey
Charles L. Madden
By Caswell + Lagaard
Attorneys Patented Feb. 13, 1940

2,189,901

UNITED STATES PATENT OFFICE 2,189,901

CAR WHEEL

Arthur J. Hersey and Charles L. Madden,
Minneapolis, Minn.

Application February 1, 1937, Serial No. 123,385

15 Claims. (Cl. 295—11)

Our invention relates to car wheels having metal tires adapted to ride upon rails and has for an object thereof to provide highly practical and serviceable cushioning means, between tire and the wheel proper, for absorbing vibrations set up in the tire and preventing the transmission of such vibrations through the wheel to other parts of the vehicle.

Another object of the invention resides in providing simple and effective means for removably holding the tire in position through the medium of the cushioning means.

A further object of the invention resides in constructing the cushioning means and the associated parts of a wheel so as to effectively resist the stresses set up in the cushioning means.

Another object of the invention resides in constructing the cushioning means in the form of paired rings, each substantially Z-shaped in cross section and consisting of a number of segmental sections.

A feature of the invention resides in constructing the cushion rings of different widths so that the flange clearance may be varied by interchanging the rings.

A feature of the invention resides in the provision of means on the wheel rim and tire for engagement with the ends of the cushion sections to transmit torque from the rim to the tire, and vice versa, through said cushion sections.

Another object of the invention is to provide a wheel rim and resilient ring construction in which the ring sections circumferentially interlock with the rim and thus retain their relation radially thereof in the absence of the tire.

A further object of the invention is to provide a wheel having a resilient ring fitted between the rim and tire thereof, the material of such ring being free to flow transversely of the wheel, but under restraint attended with progressively increasing resistance to such flowage.

Other objects of the invention reside in the novel combination and arrangement of parts and in the details of construction hereinafter illustrated and/or described.

In the drawing:

Fig. 1 is a side elevational view of a car wheel illustrating an embodiment of our invention, said wheel being shown as resting on a rail and with a portion thereof in section.

Fig. 2 is a longitudinal sectional view taken on line 2—2 of Fig. 1 and drawn to a larger scale.

Fig. 3 is a sectional perspective detail view taken on line 3—3 of Fig. 1 and drawn to a larger scale.

In railway practice, considerable axle bearing failure results from the battering of the bearings caused through shocks encountered by the wheels of the vehicles in travel over irregular rail surfaces. The employment of the present invention in vehicle wheel construction prevents to a large extent such bearing failures and, in addition, materially enhances the riding qualities of a vehicle.

Our invention is particularly adaptable for use in connection with railway cars and locomotives and for the purpose of illustrating an application of the invention, a railway rail 10 has been shown in the drawing. This rail comprises a head 11 on which the wheels rest, a base 12 and a web 13 connecting the head to the base.

The car wheel illustrated in the drawing comprises a hub 15 and a rim 16 connected to the hub by means of a web 17. Spaced from the rim 16 in encircling relation is a metal tire 18 which is resiliently supported on the rim 16 by cushioning means occupying the annular space between said rim and tire.

Inasmuch as the particular construction of the hub 15, bearings, brake and parts of the wheel associated therewith form no part of the presently claimed invention, said parts have not been illustrated in detail and will require no detail explanation. And, it will be understood that, without regard to hub or bearing construction, the invention may be embodied in any type or form of car wheel.

The rim 16 of the illustrated wheel has a cylindrical surface 21 at the periphery thereof. Said rim is formed, at the inside face of the wheel, with an annular flange 25 extending outwardly from said cylindrical surface 21 and is formed, at the outside face of the wheel, with an annular shoulder 22 disposed inwardly of said cylindrical surface 21. Complementing said flange 25 is a clamping ring 31. This clamping ring bears at its inner periphery upon the annular shoulder 22 and is removably attached to the rim 16 by means of bolts 37 extending through the rim 16 and said clamping ring 31, said bolts being fitted with clamping nuts 38 which are turned against said ring. At their outer margins said flange 25 and clamping ring 31 are provided with facing heads 59 and 64 respectively, and, undercutting said beads adjacent to the cylindrical surface 21 of the rim 16, are grooves 61 and 65 respectively formed in said flange and ring. The outer peripheries of the flange 25 and clamping ring 31 are formed to provide annular bearing surfaces 29 and 35 which slope inwardly toward the axis of the wheel from their respective faces of said wheel.

The tire 18 has an outwardly extending rail flange 41, as usually provided, and is formed with an inner annular rib 43 midway between its edges. This annular rib 43 occupies a position, between the flange 25 and clamping ring 31 and is spaced from both thereof and from the cylindrical surface 21 of the rim 16. The inner periphery of the tire 18 provides cylindrical bearing surfaces 47 and 48 at either side of the rib 43. The opposite faces of said rib comprise lateral bearing surfaces 45 and 46 and said rib 43, at its inner periphery, is oppositely beveled to provide sloping annular bearing surfaces 45a and 46a which converge toward a plane substantially midway between the faces of the wheel.

The cushioning means interposed between the rim 16 and tire 18 comprises a pair of resilient rings 51, 52 of rubber or other suitable composition. The cushion ring 51 consists of a number of identical segmental sections 49 arranged end to end and, likewise, the cushion ring 52 consists of a number of identical segmental sections 50. The sections 49 of the cushion ring 51 are identical to the sections 50 of the cushion ring 52, except that said sections 49 are somewhat thicker than the sections 50. The length of each of the ring sections 49, 50 is substantially equal to one-quarter of the circumference of that portion of the wheel where the cushion rings 51, 52 fit between rim 16 and tire 18. Each ring section is uniform throughout its length and is substantially Z shaped in cross section, the legs 53 of sections, assembled in a ring, forming an outer annular portion, the legs 54 forming an inner annular portion offset from said outer annular portion, and the webs 55 forming an interconnecting medium between said inner and outer annular portions.

Companion sections 49, 50 of the two cushion rings 51, 52 occupy a reversed relationship in the wheel structure. In each ring section 49, the outer leg 53 has an outer cylindrical surface conforming with the inner cylindrical surface 47 of the tire 18 and an inner sloping surface conforming with the sloping peripheral surface 29 of the flange 25. The inner leg 54 has an inner cylindrical surface conforming with the cylindrical surface 21 of the rim 16 and an outer sloping surface conforming with the inner beveled annular surface 45a of the tire rib 43. The web 55 and leg 53, together, provide a lateral surface conforming with the lateral surface 45 of the rib 43, while at the opposite side of the section said web 53 is grooved to receive the annular bead 59 on the flange 25 and said leg 54 is formed with a bead conforming with the annular groove 61 in said flange. The ring sections 50, reversed with respect to the ring sections 49, conform to the tire 18, rim 16 and clamping ring 31 in the same manner that said sections 49 conform to the tire 18, rim 16 and flange 25.

When not compressed under a load, the facing edges of the legs 54 of companion sections 49, 50 fall short of each other leaving a space 75 between said legs into which material of said sections may be compressed. The opposed edges of the legs 53 of the ring sections 49, 50 fall short of their respective wheel faces leaving open spaces 77 adjacent to such edges into which material of said ring sections may be compressed. Owing to the inclination of the surfaces 29 and 35 of the flange 25 and clamping ring 31 relative to the cylindrical surfaces 47, 48 of the tire 18 and owing to the inclination of the beveled surfaces 45a and 46a of the tire rib 43 relative to the cylindrical surface 21 of the rim 16, the material of the legs 53, 54 of the ring sections 49, 50 will flow into the said spaces 75, 77 under the stresses transmitted from rim 16 to tire 18 and under compression of said ring sections caused by the tightening of the clamping nuts 38, but, as will be readily comprehended, such flowage of the resilient material of the ring sections 49, 50 will be attended with progressively increasing resistance. In this connection, it will be noted that in Fig. 2, the ring sections 49, 50 at the lower portion of the wheel are shown, as compressed, under the weight of a load carried by the wheel, while the ring sections 49, 50 at the upper portion of the wheel are shown in the form assumed thereby when they are relieved of such load.

Means provided in the wheel structure and cooperating with the ring sections 49, 50 preclude relative angular movement between the rim 16 and tire 18 and such means further serves to transmit torque from the wheel proper to the tire and vice versa. Said means comprises sets of companion abutment fins 68, 66 for the ring sections 49 and sets of companion abutment fins 69, 67 for the ring sections 50. In each set of fins for the ring sections 49, the fin 68 is disposed transversely of the tire 18. This fin 68 is triangular in form and is located in the reentrant angle between the cylindrical surface of the tire 47 and the lateral surface 45 of the rib 43, said fin being welded or otherwise secured to the tire 18 proper and to said rib. The companion fin 66 of the set is applied to the rim 16 transversely thereof. It occupies a position in the angle between the rim 16 proper and the flange 25 and is welded or otherwise secured to each thereof. There are four sets of tire and rim fins 68, 66 for the four sections 49 of the cushion ring 51. These sets of fins equally spaced apart annularly of the rim 16 and tire 18 and the fins of each set, located in a common plane radially of the wheel, form abutments against which the adjacent ends of the adjoining ring sections 49 bear. The free edges of the tire and rim fins 68, 66 are spaced apart sufficiently to avoid contact one with the other under all ordinary conditions in the use of the wheel. For the four ring sections 50 of the cushion ring 52 there are four additional sets of tire and rim fins 69, 67 similar to said sets of companion fins 68, 66. Like the tire fins 68 above described, the tire fins 69 for the ring sections 50 are secured to the tire 18, the attachment thereto being along the surface 48 of the tire proper and the lateral surface 46 of the rib 43. The rim fins 67 for the ring sections 50 like the corresponding rim fins 66 for the ring sections 49, occupy positions in the angle between the rim 16 and the clamping ring 31. These rim fins 67, however, are attached solely to said clamping ring 31, which, as above explained, is detachably secured to said rim 16.

As shown, each set of abutment fins 68, 66 for the ring sections 49 occupies a radial plane common to a set of fins 69, 67 for the ring sections 50. It is, of course, required that the paired fins 68, 66 for the ring sections 49 be in a common plane and that the paired fins 69, 67 for the ring sections 50 to be coplanar, but it is not necessary that paired fins at one side of the wheel and paired fins at the other side of the wheel be in one and the same plane. In fact, our invention contemplates, the staggering of section joints in cushion ring 51 with respect to the section joints in cushion ring 52, in which arrangement the abutment fins in no two sets would be in the same plane. Although this feature of staggering the joints of the ring sections 49, 50 is not illustrated, the staggering of the paired abutment fins by which said feature is attained will be readily understood and the advantage in such feature for enhancing the smooth riding qualities of the wheel will be appreciated.

In assembling with the rim 16, the ring sections 49, tire 18, ring sections 50 and clamping ring 31, said parts are applied to said rim in the order named. The first operation is accomplished by passing the ring sections 49 between the abutment fins 66 on the rim 16 and pressing said sections 49 into circumferential interlocking engagement with the grooved and beaded flange 25, such engagement of said sections 49 with the rim structure holding those sections at the lower portion of the rim structure, as well as at the upper portion thereof, from radial dislodgment therefrom. With all of said sections 49 securely caught in their respective positions on the rim 16, the tire 18 is slipped edgewise over the assembled ring sections 49 into the position substantially as shown in Fig. 2. The ring sections 50 are then inserted between the tire 18 and rim 16 and, of course, between the abutment fins 69 on the tire. The clamping ring 31 is next applied, it being necessary in this operation to present the clamping ring 31 in such relation angularly of the tire 18 that the abutment fins 67 on the clamping ring 31 will register with the abutment fins 69 on the tire 18 and thereby be able to enter between the ends of the ring sections 50. This coplanar relation of fins 67 and 69 having been attained, the bolt openings in the clamping ring 31 will register with the bolts 37. Said clamping ring 31 is thereupon pushed into place and the nuts 38 screwed onto the bolts 37 and against the clamping ring. As these nuts 38 are tightened, the clamping ring 31 presses against the ring sections 50 which, in turn, press against the rib 43 of the tire 18 and said rib, in its turn, presses against the ring sections 49. This relative movement of the parts causes the resilient ring sections 49, 50 to be compressed with the result that the tire 18 is firmly clamped to the rim 16 through the medium of said ring sections 49, 50. The degree to which said resilient ring sections 49, 50 are compressed by means of the clamping ring 31 depends upon the amount of resiliency desired in said ring sections for the particular duty to which the wheel is to be put. Such control of the resiliency of the ring sections 49, 50 is definitely attainable, due to the progressively increasing restriction set up against the flowage of the resilient ring material toward the extremities of the legs of said ring sections.

As previously stated, the cushion ring 51 is thicker than the cushion ring 52. When the parts are assembled, as above described, minimum flange clearance between the tire flange 41 and rail head 11 is procured. If it be desired, however, to increase the flange clearance, the two cushion rings 51, 52 are interchanged, cushion ring 52 being applied first and, after the tire 18 is in place, the cushion ring 51 and clamp ring 31 are applied. This changes the position of the tire 18 relative to the wheel proper, as indicated in dotted lines at 80 in Fig. 2, thereby increasing the tire flange clearance.

Radial compression stresses are distributed practically throughout the entire mass of cushioning material in the ring sections 49, 50, while the axial stresses are met largely by the limited mass of cushioning material in the webs 55. This feature provides for amply cushioning the wheel under radial stresses and confines, within practical limits, the resiliency of the ring sections 49, 50 under axial stresses. The invention is otherwise advantageous in that an extremely simple and practical construction is provided, whereby the tire of a railway wheel may be effectively cushioned by resilient members constructed of rubber or other similar material. By means of the construction used, vibrations produced in the tire of the wheel are absorbed, thereby preventing bearing failure and injury to the wheel proper and the structure carried thereby. The parts of the wheel and the cushioning ring sections are readily assembled and disassembled and one or any number of the ring sections may be quickly and easily replaced when occasion demands. The construction is designed to utilize a minimum amount of material in the cushion members. The movement of the tire with respect to the rim is a minimum with the maximum cushioning effect, thereby preventing unnecessary lateral movement of the vehicle and minimizing the power required to propel the vehicle. The construction employed provides for the controlled flowage of the cushioning material, thereby insuring longevity of the cushion members. By reversing the cushion rings, different degrees of flange clearance can be procured.

Changes in the specific form of our invention as herein disclosed, may be made within the scope of what is claimed without departing from the spirit of our invention.

Having described our invention, what we claim as new and desire to protect by Letters Patent is:

1. A wheel having a rim and a tire annularly spaced from said rim, a resilient ring fitted between said rim and tire and consisting of a number of segmental sections, said rim and tire having a number of sets of companion fins thereon, the several sets of companion fins being spaced apart annularly of the wheel and each set occupying a plane radially of the wheel and constituting abutments common to the adjacent ends of adjacent ring sections, the fins of each set being spaced apart in their common plane to avoid contact, one with the other, upon the compression of their corresponding ring sections said tire being adapted to be applied to said rim with the ring sections in place thereon, the fins on the rim serving to space said ring sections for the reception therebetween of the fins on the tire.

2. In a car wheel, a rim, a flange issuing outwardly from said rim at one side thereof, a clamp ring disposed at the opposite side of said rim and spaced from said flange, a tire encircling said rim and spaced from said flange and clamp ring, said tire having an outwardly projecting rail flange thereon and an inwardly projecting rib disposed between said flange and clamp ring and spaced therefrom, a cushion ring fitted between said rim, rim flange, tire and rib, a second cushion ring fitted between said rim, clamp ring, tire and rib, said clamp ring serving to compress the cushion rings axially thereof and expand the same radially against rim and tire, the thickness of one ring being greater than that of the other, and said rings being interchangeable to change the lateral relation between tire and rim and thereby vary the clearance between said rail flange and the rail upon which the wheel rests.

3. A car wheel having a rim, a tire with a rail flange thereon, said tire being annularly spaced from the rim, a pair of resilient rings fitted between said rim and tire, said rim, rings and tire cooperating to interlock the tire and rim and thereby secure said tire against movement lateral of the rim in excess of the limit of resiliency of said rings, the thickness of one ring being greater than that of the other, and said rings being interchangeable to change the lateral relation between tire and rim and thereby vary the clearance between said rail flange and the rail upon which the wheel rests.

4. In a wheel, a rim having an external annular flange at one side thereof, a number of radial fins disposed in spaced relation transversely of the rim at the outer periphery thereof and secured to said rim and to said flange, a tire for said rim, said tire having an internal annular rib, a set of radial fins disposed in spaced relation transversely of the tire at the inner periphery thereof and at one side of said rib, said fins being secured to said tire and to said rib, the number and relative spacing of said tire fins corresponding with the number and relative spacing of said rim fins, a set of segmental cushion members encircling said rim, the ends of each member abutting adjacent fins on the rim, said tire being adapted to be passed sidewise over the cushion members on said rim, the fins on said tire being adapted to be received between the ends of the cushion members abutting the fins on said rim, a second set of radial fins disposed in spaced relation transversely of the tire at its inner periphery and at the side of said rib opposite those of said first set of tire fins, said second set of tire fins being secured to the tire and the rib, a second set of segmental cushion members adapted to encircle said rim with the ends of each member abutting adjacent fins of said second set of tire fins, a clamp ring applicable to the side of the wheel opposite said rim flange, said clamp ring being provided with fins of the same number and same relative spacing as those of said second set of tire fins, said ring fins being adapted to be received between the ends of the cushion members abutting said second set of tire fins, and means for securing the clamping ring relative to the wheel rim with said rim fins so positioned.

5. In a wheel, a rim having an external annular flange, a number of radial fins disposed in spaced relation transversely of the rim at the outer periphery thereof and secured to said rim and to said flange, a tire for said rim, said tire having an internal annular rib, radial fins disposed in spaced relation transversely of the tire at the inner periphery thereof and secured to said tire and to said rib, the number and relative spacing of said tire fins corresponding with the number and relative spacing of said rim fins, segmental cushion members encircling said rim, the ends of each member abutting adjacent fins on the rim, said tire being adapted to be passed sidewise over the cushion members on said rim, the fins on said tire being adapted to be received between the ends of the cushion members abutting the fins on said rim, and means for holding the tire in rim encircling relation.

6. In a wheel, a rim having an outer cylindrical surface, an annular flange at one side of said rim having an inner marginal bead, a clamp ring at the other side of said rim, having an inner marginal bead, said beaded flange and beaded clamp ring presenting sloping peripheral surfaces diverging toward their respective faces of said wheel, a rim encircling tire having an inner cylindrical surface facing said sloping surfaces and spaced therefrom, said tire having an internal rib oppositely beveled internally to form sloping bearing surfaces, said rib being disposed between said flange and ring and spaced therefrom and from said rim, said wheel parts forming, at either side of said rib, concentric channels and a throat therebetween, the outer channel being open at its respective face of the wheel and the inner channel communicating with the corresponding channel at the other side of the wheel, cushion rings between the tire and rim, one at either side of said rib, each cushion ring having inner and outer annular portions respectively conforming with the concentric channels at its respective side of the wheel and having a web portion conforming with the throat between said channels.

7. In a wheel, a rim having an outer cylindrical surface, an annular flange at one side of said rim having an inner marginal bead, said beaded flange presenting a peripheral surface sloping away from the axis of the wheel toward its corresponding face of said wheel, a rim encircling tire having an inner cylindrical surface facing said sloping surface and spaced therefrom, said tire having an internal rib beveled internally to form a bearing surface sloping in the same general direction as said sloping surface of said flange, said rib being spaced sidewise from said flange and internally from said rim, said wheel parts forming concentric channels and a throat therebetween, the outer channel being open at said face of said wheel, a cushion ring between the tire and rim, said cushion ring having inner and outer annular portions respectively conforming with said concentric channels and having a web portion conforming with the throat between said channels, and means for maintaining the tire in rim encircling relation.

8. In a wheel, a rim, annular flanges at either side of said rim, a tire spaced from and encircling said rim and flanges, said tire having an internal rib spaced between said flanges and from said rim, said wheel parts being formed to provide radially inner and outer concentric channels at either side of the wheel structure, each outer channel being open at its respective face of the wheel and progressively restricted in the direction of said face, each inner channel being open annularly to its respective outer channel and progressively restricted in the direction of such channel, each inner channel being also open annularly, beneath said rib, to the inner channel at the other side of the wheel structure, cushion means of resilient material interposed between tire and rim and having, at either side of the wheel structure, radially inner and outer annular portions respectively conforming with the radially inner and outer channels at their respective side of the wheel structure.

9. In a wheel, a rim, an annular flange on the rim, a tire spaced from and encircling said rim and flange, said tire having an internal rib spaced sidewise from said flange and internally from said rim, said wheel parts being formed to provide radially inner and outer concentric channels, the outer channel being open at the face of the wheel and progressively restricted in the direction of said face, the inner channel being open annularly to the outer channel and progressively restricted in the direction of such channel, cushion means of resilient material interposed between tire and rim and having radially inner and outer annular portions respectively conforming with said inner and outer channels of the wheel structure, and means for maintaining the tire in rim encircling relation.

10. In a wheel, a rim, a tire encircling the rim and having an internal rib internally spaced from said rim, said wheel parts forming, at either side of the central plane of said rib, radially inner and outer channels and a throat therebetween, the inner channels opening one into the other between rib and rim, insert means of resilient material interposed between tire and rim, said means having radially inner and outer annular portions at either side of said plane conforming with the correspondingly disposed inner and outer channels, each inner annular portion being connected with its respective outer annular portion by a web conforming with the throat between the radially inner and outer channels for such inner and outer insert portions.

11. In a wheel, a rim, a tire encircling the rim and having an internal rib internally spaced from said rim, said wheel parts forming an outer annular channel, a radially inner channel offset from said outer channel, and a throat between said channels, a resilient ring interposed between tire and rim, said ring having an outer annular portion conforming with said outer channel and oppositely engaged by tire and rim, said ring also having a radially inner annular portion, offset from said outer annular portion, conforming with said inner channel and oppositely engaged by said rib and rim, said ring further having a web between said radially outer and inner annular portions conforming with said throat between said outer and inner channels.

12. In combination, two concentric members formed to provide between them an annular space including annularly communicating concentric channels, resilient cushioning material filling said channels and extending from one channel to another, said material being subject to compression between said members upon relative radial movement thereof and thereupon flowable in said channels, in a direction as from one channel to another, that portion of one channel contiguous to its opening into the adjacent channel being progressively constricted in said direction of flow and that portion of such adjacent channel remote from such opening being likewise progressively constricted in the same direction, said constrictions providing cumulatively increasing resistance to the flow of the cushioning material within said channels.

13. In combination, two annular members, one encircling the other and spaced therefrom, one member having an annular flange at one side thereof and a clamp ring at its opposite side, said flange being formed with an inner marginal bead thereon, said clamp ring being similarly formed with an inner marginal bead facing the bead on said flange, the other annular member having an annular rib extending between said beads and spaced therefrom, said members forming at each side thereof radially inner and outer concentric channels with an annular throat therebetween, annular cushioning means of resilient material compressed axially between said flange and clamp ring and thereby radially compressed between said members proper, said means having radially inner and outer annular portions connected by an annular web portion, said portions being conformingly accommodated in the radially inner and outer channels and throat, respectively, at one side of said members, said means also having radially inner and outer annular portions connected by an annular web portion, the same being conformingly accommodated in the radially inner and outer channels and throat, respectively, at the other side of said members.

14. In combination, two annular members, one encircling the other and spaced therefrom, one member having an annular flange thereon formed with an inner marginal bead, the other annular member having an annular rib spaced sidewise from said bead, said members forming radially inner and outer concentric channels with an annular throat therebetween, annular cushioning means of resilient material interposed between said annular members, said means having radially inner and outer annular portions connected by an annular web portion, said portions being conformingly accommodated in said radially inner and outer channels and throat, respectively, and means for relatively axially adjusting said members to compress the material of said cushioning means axially between said flange and rib and radially between said members proper.

15. In combination, two spaced relatively movable members formed to provide between them a succession of laterally communicating channels, a mass of resilient cushioning material completely filling said channels and extending from one channel to another, said material being subject to compression between said members upon the movement of one toward the other thereof and thereupon flowable along the succession of channels, that portion of one channel contiguous to its opening into the adjacent channel being progressively constricted in the direction of the flow of said material and that portion of such adjacent channel remote from such opening being likewise progressively constricted in the same direction, said constrictions providing cumulatively increasing resistance to said directional flow of the cushioning material.

ARTHUR J. HERSEY.
CHARLES L. MADDEN.